Patented Oct. 21, 1952

2,615,059

UNITED STATES PATENT OFFICE 2,615,059

STABILIZED RUBBER ADHESIVE

Cyrus W. Bemmels, New Brunswick, N. J., assignor to Industrial Tape Corporation, a corporation of New Jersey No Drawing. Application July 7, 1949, Serial No. 103,540

4 Claims. (Cl. 260—755)

This invention relates to stabilizers for soft rubber compounds.

Normally tacky, pressure-sensitive adhesive masses are representative of a type of rubbery compound which, as distinguished from highly vulcanized and at least partially insolubilized compositions of the type of mechanical rubber goods, is relatively soft prior to and during actual use and undergoes slight vulcanization or cure only in rare cases. The usual soft rubber compound is as soft and soluble as the rubber upon which it is based and normally even softer and more soluble.

Compounds of this nature are subject to oxidation and other deteriorating influences. In the course of this oxidation the compound softens substantially at first, i. e., in the first few weeks or months of aging, and hardens thereafter progressively, soon reaching the point where the softness and tack required in adhesives and similar compounds are totally absent and where the end product becomes useless. Some extension of the useful life of soft rubber compounds is obtained with the rubber antioxidants of the prior art, but this improvement is much less pronounced in soft and soluble compounds than in the case of so-called mechanical rubber compounds which are substantially vulcanized. After such vulcanization, perhaps due to their tightly bonded, insoluble state, vulcanized mechanical rubber compounds appear substantially stabilized against most oxidative influences, if standard rubber antioxidants of the prior art are incorporated. The soft rubber compounds on the other hand remain soluble (for instance in aliphatic solvents such as normal heptane), reactive, and accordingly subject to oxidation prior to and during use. In some cases soft rubber compounds lose all of their valuable properties between the time that they are made and first tested and the time at which they are to be used, sometimes in a few weeks.

This invention is based on the discovery that oxidation of the above described soft rubber compounds may be substantially prevented by addition thereto of certain metal dithiocarbamates. Some metal dithiocarbamates have been used in the past as accelerators in the sulphur vulcanization of hard rubber compounds, but, due to the fact that sulphur vulcanization appears to inhibit oxidation substantially when normal antioxidants such as the ones of the prior art are present, the oxidation inhibiting properties of these metal dithiocarbamates were not utilized in such vulcanized compounds.

In accordance with the present invention some metal dithiocarbamates are used in substantially uncured and accordingly soluble rubber compositions which are substantially uncurable as no amount of sulphur or other sulphur bearing curing agents that would cause curing or insolubility are present. The invention involves the incorporation of preferably from about 0.3 to about ten per cent of a metal dithiocarbamate in soft and insoluble rubber compounds that are both substantially uncured and substantially uncurable.

Apparently the dithiocarbamates act in soluble soft rubber compounds of this type to prevent oxidation of the rubber substantially without curing or vulcanizing the rubber. Were the soft rubber compound vulcanized by the action of the dithiocarbamates, the tackiness of the compounds and many other valuable properties would be lost. A high degree of solubility in itself forms an important advantage of soft rubber compounds and this solubility is lost usually at a relatively low vulcanization stage after somewhat less cure than is required to make a satisfactory vulcanized product such as a tire, a hot water bottle, rubber tubing, and the like.

The dithiocarbamates of antimony, bismuth, cadmium, copper, lead, selenium, sodium, tin, and zinc are most satisfactory in inhibiting oxidation of soft and soluble rubber compounds. The formula of such a metal dithiocarbamate may be represented by

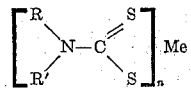

For satisfactory oxidation resistance R in any dithiocarbamate group of this formula may be any alkyl (including aralkyl), aryl (including alkaryl), or alkamine group. R' can be hydrogen or any alkyl (including aralkyl) or alkamine group. Me may be any of the above mentioned metals. $n$ equals the valence of the metal. R and R' groups having from 1 to 11 carbon atoms are preferred, although some inhibition of oxidation is encountered even in dithiocarbomates having very long chain carbon radicals. In polyvalent metal dithiocarbamates the individual dithiocarbamate radicals may differ from each other. Best activity is encountered with dithiocarbamates wherein R and R' each are saturated and include 2 to 9 carbons, preferably as aliphatic chains. While the inhibiting effect does not decrease substantially on a molar basis in compounds wherein R and/or R' contain more than 4 carbons, the inhibiting effect is somewhat lower in a direct weight comparison apparently because the number of active molecules becomes less as the substituted radical becomes larger. Of course, more than one dithiocarbamate may be present in any one soft rubber compound.

The soft and soluble rubber compounds that are commercially most satisfactory contain from about one to about three per cent by weight of the total compound of dithiocarbamate, although benefits are obtained using lower amounts. Amounts higher than three per cent are desirable in some cases, e. g. where maximum insurance against oxidation is desired, or where very high molecular weight dithiocarbamates are used.

To illustrate representative embodiments of the invention by way of example only, but not to limit the scope of the invention in any way, several examples of preferred embodiments are described. The amount of ingredients in all of these examples are given as parts by weight.

*Example I*

Rubber, natural, raw _____ 100
Hydrogenated rosin glyceride (melting point, 80° C.) _____ 31
Polybetapinene (melting point, 115° C.) __ 31
Paratertiary amyl phenol formaldehyde resin, soluble (melting point, 85° C.) ____ 5.5
Butylated polyhydroxy phenol, acetone soluble (melting point above 150° C.) (A standard prior art antioxidant) _____ 2.75
Zinc dibutyl dithiocarbamate _____ 2

The above ingredients are incorporated on a rubber mill in the usual manner until a homogeneous blend is obtained. Alternatively the ingredients may be blended in an internal mixer after preliminary milling of the rubber to cause them to blend more readily. The soft and soluble rubber compound forms a satisfactory normally tacky and pressure sensitive adhesive mass and has a considerably more uniform useful life than corresponding products comprising either no antioxidant whatsoever or only standard antioxidants of the prior art.

Several other examples using widely varied dithiocarbamates and other ingredients are illustrated in the table that follows:

| Example No. | II | III | IV | V | VI | VII | VIII | IX[1] | X[2] | XI | XII | XIII | XIV | XV |
|---|---|---|---|---|---|---|---|---|---|---|---|---|---|---|
| Ingredient of Formulae: | | | | | | | | | | | | | | |
| Balata, Chilte | | | | | | | | 5.0 | | | | | | |
| Balata, Massara | | | | | | | | 10.0 | | | | | | |
| Balata, Venezuelan | | | | | | | | 10.0 | | | | | | |
| Butadiene (76%)-Styrene (24%) Copolymer, Mooney Value 66 | | | | | 5.0 | | | | | | | | | |
| Polyisobutylene (Molecular Weight 80,000–120,000) | 5.5 | | | | | | | | | | | | | |
| Rubber, Natural, Raw | 27.5 | 36.0 | 101 | 33.0 | 10.0 | 10.0 | 5.0 | | 4.0 | 10.0 | 10.0 | 10.0 | 10.0 | 10.0 |
| Rubber, Reclaim "Devulcanized" | | | | | | | 16.7 | | | | | | | |
| Paratertiary Amyl Phenol Formaldehyde, soluble and reactive (melting point, 85° C.) | | | | | | | | | | | | 0.5 | 0.5 | |
| Polybetapinene (melting point, 70° C.) | | 15.0 | | | | | | | | | | | | |
| Polybetapinene (melting point, 115° C.) | | 15.0 | | | | 6.0 | | | | | | | | 4.1 |
| Rosin, Dehydrogenated (melting point, 75° C.) | 28.6 | | 86.7 | 28.0 | 8.0 | | 13.0 | | | 8.0 | 8.0 | 3.0 | 3.0 | 4.1 |
| Rosin, Gum (melting point, 80° C.) | | | | | | | | | 3.0 | | | | | |
| Rosin, Hydrogenated (melting point, 76° C.) | | | | | | 6.0 | | | | | | | | |
| Rosin, Hydrogenated, Glyceride (melting point, 80° C.) | | | | | | | | | | | | 3.0 | 3.0 | |
| Lanolin | 7.1 | 4.0 | 21.8 | 7.0 | 1.0 | | 3.0 | | | 1.0 | 1.0 | | | 1.1 |
| Oil, Mineral | | | | | | 4.0 | | | | | | | | |
| Paraffin Wax (melting point, 165° C.) | | | | | | | | | 2.5 | | | | | |
| Calcium Carbonate | | | | | 7.0 | | | | | | | | | |
| Clay | | | | | | 2.5 | | | | | | | | |
| Starch | 8.8 | | 26.7 | 5.0 | | | | | | | | | | |
| Talc | | | | | | | | | 25.0 | | | | | |
| Titanium Dioxide | | | 26.7 | 5.0 | | | | | | | | | | |
| Zinc Oxide | 22.5 | 30.0 | 41.2 | 21.0 | | | | | | | | | | 8.3 |
| Paratertiary Amyl Polyhydroxyphenol (melting point, 150° C.) | | | | | | | | | | | | 0.3 | 0.3 | 0.3 |
| Phenyl-beta-Naphtylamine | | | | | | 0.3 | | | | | | | | |
| Antimony Dibutyl Dithiocarbamate | 3.0 | | | | | | | | | | | | | |
| Bismuth Diethyl Dithiocarbamate | | 3.0 | | | | | | | | | | | | |
| Bismuth Dimethyl Dithiocarbamate | | | 9.1 | | | | | | | | | | | |
| Cadmium Dibutyl Dithiocarbamate | | | | 1.0 | | | | | | | | | | |
| Copper Dimethyl Dithiocarbamate | | | | | 0.4 | | | | | | | | | |
| Lead Dimethyl Dithiocarbamate | | | | | | | 1.5 | | | | | | | |
| Selenium Dibutyl Dithiocarbamate | | | | | | | | 0.9 | | | | | | |
| Selenium Diethyl Dithiocarbamate | | | | | | | | | 1.0 | | | | | |
| Sodium Dibutyl Dithiocarbamate | | | | | | | | | | 0.3 | | | | |
| Tin Dibutyl Dithiocarbamate | | | | | | | | | | | 0.5 | | | |
| Zinc Butyl Dithiocarbamate | | | | | | | | | | | | 0.2 | | |
| Zinc Diamyl Dithiocarbamate | | | | | | | | | | | | | 0.3 | |
| Zinc Dibenzyl Dithiocarbamate | | | | | | | | | | | | | 0.5 | |
| Zinc Dibutyl Dithiocarbamate | | | | | | | | | | | | | | 0.3 |
| Zinc Diethyl Dithiocarbamate | | | | | | | | | | | | | | |
| Zinc Diethylenetriamine Dithiocarbamate | | | | | | | | | | | | | | |
| Zinc Diisoamyl Dithiocarbamate | | | | | | | | | | | | | | |
| Zinc Diisopropyl Dithiocarbamate | | | | | | | | | | | | | | |
| Zinc Dimethyl Dithiocarbamate | | | | | | | | | | | | | | |
| Zinc Dioctyl Dithiocarbamate | | | | | | | | | | | | | | |
| Zinc (Orthotolylaminoethyl) Orthotolyl Dimethyl Dithiocarbamate | | | | | | | | | | | | | | |
| Zinc Octadecyl Dithiocarbamate | | | | | | | | | | | | | | |
| Zinc n-Pentamethylene Dithiocarbamate | | | | | | | | | | | | | | |
| Zinc Phenyl Ethyl Dithiocarbamate | | | | | | | | | | | | | | |

| Example No. | XVI | XVII | XVIII | XIX | XX | XXI | XXII | XXIII | XXIV | XXV | XXVI | XXVII | XXVIII | XXIX |
|---|---|---|---|---|---|---|---|---|---|---|---|---|---|---|
| Ingredient of Formulae: | | | | | | | | | | | | | | |
| Balata, Chilte | | | | | | | | | | | | | | |
| Balata, Massara | | | | | | | | | | | | | | |
| Balata, Venzuelan | | | | | | | | | | | | | | |
| Butadiene (76%)-Styrene (24%) Copolymer, Mooney Value 66 | | | | | | | | | | | | | | |
| Polyisobutylene (Molecular Weight 80,000–120,000) | | | | | | | | | | | | | | |
| Rubber, Natural, Raw | 10.0 | 10.0 | 10.0 | 10.0 | 10.0 | 10.0 | 10.0 | 10.0 | 10.0 | 10.0 | 10.0 | 10.0 | 10.0 | 10.0 |
| Rubber, Reclaim "Devulcanized" | | | | | | | | | | | | | | |
| Paratertiary Amyl Phenol Formaldehyde, soluble and reactive (melting point, 85° C.) | 0.5 | 0.5 | 0.5 | 0.5 | 0.5 | 0.5 | 0.6 | 0.6 | 0.6 | 0.6 | 0.6 | 0.9 | 0.6 | 0.6 |
| Polybetapinene (melting point, 70° C.) | | | | | | | 6.6 | 6.6 | 6.6 | 6.6 | 6.6 | | 6.7 | 6.7 |
| Polybetapinene (melting point, 115° C.) | | | | | | | | | | | | | | |
| Rosin, Dehydrogenated (melting point, 75° C.) | 3.0 | 3.0 | 3.0 | 3.0 | 3.0 | 3.0 | | | | | | 3.0 | | |
| Rosin, Gum (melting point, 80° C.) | | | | | | | | | | | | | | |
| Rosin, Hydrogenated (melting point, 76° C.) | | | | | | | | | | | | | | |
| Rosin, Hydrogenated, Glyceride (melting point, 80° C.) | 3.0 | 3.0 | 3.0 | 3.0 | 3.0 | 3.0 | | | | | | 3.0 | | |
| Lanolin | | | | | | | 1.4 | 1.4 | 1.4 | 1.4 | 1.4 | | 1.4 | 1.4 |
| Oil, Mineral | | | | | | | | | | | | | | |
| Parraffin Wax (melting point, 165° C.) | | | | | | | | | | | | | | |
| Calcium Carbonate | | | | | | | | | | | | | | |
| Clay | | | | | | | | | | | | | | |
| Starch | | | | | | | | | | | | | | |
| Talc | | | | | | | | | | | | | | |
| Titanium Dioxide | | | | | | | 8.0 | 8.0 | 8.0 | 8.0 | 8.0 | | 8.0 | 8.0 |
| Zinc Oxide | | | | | | | | | | | | | | |
| Paratertiary Amyl Polyhydroxyphenol (melting point, 150° C.) | 0.3 | 0.3 | 0.3 | 0.3 | 0.3 | 0.3 | 0.3 | 0.3 | 0.3 | 0.3 | 0.3 | | 0.3 | |
| Phenyl-beta-Naphtylamine | | | | | | | | | | | | 0.3 | | |
| Antimony Dibutyl Dithiocarbamate | | | | | | | | | | | | | | |
| Bismuth Diethyl Dithiocarbamate | | | | | | | | | | | | | | |
| Bismuth Dimethyl Dithiocarbamate | | | | | | | | | | | | | | |
| Cadmium Dibutyl Dithiocarbamate | | | | | | | | | | | | | | |
| Copper Dimethyl Dithiocarbamate | | | | | | | | | | | | | | |
| Lead Dimethyl Dithiocarbamate | | | | | | | | | | | | | | |
| Selenium Dibutyl Dithiocarbamate | | | | | | | | | | | | | | |
| Selenium Diethyl Dithiocarbamate | | | | | | | | | | | | | | |
| Sodium Dibutyl Dithiocarbamate | | | | | | | | | | | | | | |
| Tin Dibutyl Dithiocarbamate | | | | | | | | | | | | | | |
| Zinc Butyl Dithiocarbamate | | | | | | | | | | | | | | |
| Zinc Diamyl Dithiocarbamate | | | | | | | | | | | | | | |
| Zinc Dibenzyl Dithiocarbamate | | | | | | | | | | | | | | |
| Zinc Dibutyl Dithiocarbamate | | | | | | | | | | | | | 0.2 | 1.1 |
| Zinc Diethyl Dithiocarbamate | 0.1 | 0.7 | | | | | | | | | | | | |
| Zinc Diethylenetriamine Dithiocarbamate | | | 0.1 | | | | | | | | | | | |
| Zinc Diisoamyl Dithiocarbamate | | | | 0.9 | | | | | | | | | | |
| Zinc Diisopropyl Dithiocarbamate | | | | | 0.2 | | | | | | | | | |
| Zinc Dimethyl Dithiocarbamate | | | | | | 0.3 | | | | | | | | |
| Zinc Dioctyl Dithiocarbamate | | | | | | | 0.4 | | | | | | | |
| Zinc (Orthotolylaminoethyl) Orthotolyl Dimethyl Dithiocarbamate | | | | | | | | | | 0.2 | | | | |
| Zinc Octadecyl Dithiocarbamate | | | | | | | | 0.4 | | | 0.4 | | | |
| Zinc n-Pentamethylene Dithiocarbamate | | | | | | | | | | | | 0.2 | | |
| Zinc Phenyl Ethyl Dithiocarbamate | | | | | | | | | | | | 0.5 | | |

[1] A heat sealing adhesive composition.
[2] A shoemaker's cement; may be applied from toluol solution.

All compounds in the above table are substantially more age-resistant than the same compounds without the stabilizers of the invention.

In order to evaluate fully the advantages of adding the stabilizers of the invention to various soft and soluble rubber compositions, several tests comparing the effect of these stabilizers were made. In one type of test the following basic formula was used:

| | Parts |
|---|---|
| Rubber, raw, natural | 33 |
| Rosin, dehydrogenated | 28.6 |
| Starch | 8.8 |
| Lanolin | 7.2 |
| Titanium dioxide | 8.8 |
| Zinc oxide | 13.6 |
| Stabilizer | 3 |

This composition was processed in the same manner as Example I and then placed in an oxygen bomb to determine its behavior under strong oxidizing influences.

In another test transparent soft rubber masses of the following formula were thinly spread on a cellophane film backing, and pressed against thin bond paper, then irradiated under a 450 watt sunlamp:

| | |
|---|---|
| Rubber | 100 parts |
| Rosin glyceride (as in examples) | 31 parts |
| Polybetapinene (melting point, 150° C.) | 31 parts |
| Paratertiary amyl phenol formaldehyde | 55 parts |
| Paratertiary hydroxy phenol | 2.75 parts |
| Stabilizers of the invention | 0.001 mol per 20 grams of the above composition |

It was noted that under the influence of ultraviolet rays masses free of the stabilizers of the invention decomposed readily to a semi-fluid state and penetrated the paper while stabilized soft rubber compounds would remain in their original physical condition and did not flow. The degree of penetration of bond paper after seventy-two hours was measured in the case of many compositions. The results of these tests are summarized in the following table:

| Stabilizers Evaluated | Performance in Oxygen Bomb | Performance in Ultra-violet Tests |
|---|---|---|
| Antimony Dibutyl Dithiocarbamate | Good | |
| Bismuth Dimethyl Dithiocarbamate | do | |
| Cadmium Dibutyl Dithiocarbamate | Superior | |
| Copper Dimethyl Dithiocarbamate | Good | Very Good. |
| Lead Dimethyl Dithiocarbamate | Very Good | Do. |
| Lead (Orthotolylaminoethyl) Orthotolyl Dimethyl Dithiocarbamate | Good | |
| Zinc (Orthotolylaminoethyl) Orthotolyl Dimethyl Dithiocarbamate | Very Good | Superior. |
| Selenium Dimethyl Dithiocarbamate | Good | |
| Selenium Diethyl Dithiocarbamate | | Superior. |
| Sodium Dibutyl Dithiocarbamate | Good | |
| Tin Dibutyl Dithiocarbamate (Stannic) | Superior | |
| Zinc Butyl Dithiocarbamate | Good | |
| Zinc Di-n-Amyl Dithiocarbamate | Superior | |
| Zince Dibenzyl Dithiocarbamate | Very Good | Superior. |
| Zinc Di-n-butyl Dithiocarbamate | Superior | Do. |
| Zinc Dicetyl Dithiocarbamate | Good | |
| Zinc Diethylene Triamine Dithiocarbamate | Superior | |
| Zinc Diethyl Dithiocarbamate | do | Superior. |
| Zinc Diisoamyl Dithiocarbamate | do | Do. |
| Zinc Diisopropyl Dithiocarbamate | do | |
| Zinc Dimethyl Dithiocarbamate | Very Good | Superior. |
| Zinc Di-n-octyl Dithiocarbamate | Superior | Do. |
| Zinc Octadecyl Dithiocarbamate | Good | |
| Zinc n-Pentamethylene Dithiocarbamate | do | Superior |
| Non or only Prior Art Antioxidant | Bad | Bad. |

In the above table performance in the oxygen bomb was rated as follows:

Bad—If the compound softened within 24 hours.
Good—If the compound withstood at least 24 hours of test without softening.
Very Good—If the compound withstood at least 96 hours of the test without softening.
Superior—If the compound withstood at least 144 hours of the test without softening.

Experience shows that compounds containing only prior art anti-oxidants did not withstand 24 hours of the test.

Performance in the ultraviolet test was rated as follows:

Bad—If there was bad penetration so as to transparentise the paper.
Good—If there was only moderate penetration of the bond paper.
Very Good—If there was only slight penetration of the bond paper.
Superior—If there was no penetration of the bond paper.

Experience with compounds containing only antioxidants of the prior art shows that substantial penetration can be observed in each case where such compounds containing only prior art antioxidents undergo the test. In some cases of stabilizers reported above only one of the tests was run and accordingly only one result is reported above. Nevertheless, a large number of these and other tests made show that the results reported above are typical, significant and representative of the entire group of compounds that this invention is concerned with.

As many of the compounds listed in the preceding examples are typical normally tacky and pressure-sensitive adhesives, it should be mentioned here that such adhesives may comprise 25–90 per cent by weight of at least one rubber, which may be natural or synthetic, 0–70 per cent of at least one tackifying or other compatible resin, 0–40 per cent liquid or waxy plasticizer material, 0–80 per cent filler material, and 0–10 per cent of any standard antioxidant other than of the type of the invention. For best adhesiveness the corresponding limits are 25–75 per cent of rubber material, 10–50 per cent tackifying resin material, 0–20 per cent liquid or waxy plasticizer material, 0–50 per cent filler material, and 0–5 per cent standard antioxidant.

The invention is, of course, suitable for use in soft and soluble rubber compounds other than pressure-sensitive adhesives and some examples of such compounds were listed. Other uses of the invention in soft rubber compounds and many other variations of the above described invention will be apparent to those skilled in the art and are included in the inventive concept.

I claim:

1. A substantially uncurable, dry and normally tacky composition consisting essentially of approximately 33 per cent natural rubber in its soft, soluble and substantially unvulcanized state, approximately 28 per cent rosin, filler and, as a stabilizer, from about one to about three per cent by weight of the composition of at least one zinc dialkyl dithiocarbamate having from one to ten carbon atoms in each alkyl group.

2. A substantially uncurable, dry and normally tacky composition consisting essentially of from about thirty two per cent to about sixty per cent of natural rubber in its soft, soluble and substantially unvulcanized state, from about twenty-one per cent to about forty-one per cent of a tacky resin compatible therewith, filler, and, as a stabilizer, from about one to about three per cent by weight of the composition of at least one zinc dialkyl dithiocarbamate having from one to ten carbon atoms in each alkyl group.

3. A substantially uncurable, dry and normally tacky composition consisting essentially of from about thirty-two per cent to about sixty per cent of rubber in its soft, soluble and substantially unvulcanized state, from about twenty-one per cent to about forty-one per cent of a tacky resin compatible therewith, and, as a stabilizer, from about .03 to about ten per cent by weight of the composition of at least one dithiocarbamate of the formula:

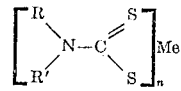

wherein R is at least one member of the group consisting of saturated and unsaturated alkyl, aryl and amino-substituted alkyl and aryl groups; R' is at least one member of the group consisting of hydrogen and any alkyl, and amino-substituted alkyl group; Me is a member of the group consisting of antimony, bismuth, cadmium, copper, lead, selenium, sodium, tin and zinc; and $n$ equals the valence of the metal.

4. A composition in accordance with claim 3 wherein the dithiocarbamate is a zinc dithiocarbamate comprising a cyclic radical with from four to nine carbon atoms.

CYRUS W. BEMMELS.

(References on following page)

REFERENCES CITED

The following references are of record in the file of this patent:

UNITED STATES PATENTS

| Number | Name | Date |
|---|---|---|
| 1,386,153 | Bruni | Aug. 2, 1921 |
| 1,499,752 | Russell | July 1, 1924 |
| 1,923,215 | Krogh | Aug. 22, 1933 |
| 2,168,873 | Cohen | Aug. 8, 1939 |
| 2,319,959 | Tierney | May 25, 1943 |

FOREIGN PATENTS

| Number | Country | Date |
|---|---|---|
| 316,692 | Great Britain | Aug. 8, 1929 |
| 368,509 | Great Britain | Mar. 10, 1932 |